United States Patent
Yoo et al.

(10) Patent No.: US 11,023,087 B2
(45) Date of Patent: Jun. 1, 2021

(54) DISPLAY APPARATUS AND CONTROL METHOD FOR DETERMINING TOUCH POSITION ON BEZEL

(71) Applicant: SAMSUNG ELECTRONICS CO., LTD., Suwon-si (KR)

(72) Inventors: Ho-june Yoo, Seoul (KR); Nam-su Ha, Anyang-si (KR); Eun-seo Kim, Gimpo-si (KR); Byung-seok Soh, Yongin-si (KR); Min-sup Kim, Suwon-si (KR); Hyun-kyu Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 45 days.

(21) Appl. No.: 16/002,708

(22) Filed: Jun. 7, 2018

(65) Prior Publication Data
US 2019/0042033 A1 Feb. 7, 2019

(30) Foreign Application Priority Data
Aug. 3, 2017 (KR) .......................... 10-2017-0098494

(51) Int. Cl.
*G06F 3/046* (2006.01)
*H04N 5/64* (2006.01)
*H04N 21/422* (2011.01)

(52) U.S. Cl.
CPC ............... *G06F 3/046* (2013.01); *H04N 5/64* (2013.01); *H04N 21/42224* (2013.01)

(58) Field of Classification Search
CPC ..... H04N 5/64; H04N 2005/443; G06F 3/046
See application file for complete search history.

(56) References Cited

U.S. PATENT DOCUMENTS 5,573,077 A * 11/1996 Knowles ............... G06F 3/0436
178/18.04
6,078,315 A * 6/2000 Huang .................. G06F 3/0436
178/18.04
(Continued)

FOREIGN PATENT DOCUMENTS

JP 2007-533040 11/2007
JP 2016-126363 7/2016
(Continued)

OTHER PUBLICATIONS

PCT International Search Report issued Office Action in PCT International Application No. PCT/KR2018/006468 dated Sep. 13, 2018 (8 pages total).
(Continued)

*Primary Examiner* — Kwang-Su Yang
(74) *Attorney, Agent, or Firm* — Staas & Halsey LLP

(57) ABSTRACT

A display apparatus includes: a display; a bezel extended along at least a partial edge of the display and configured to cover the edge of the display; at least one signal transceiver configured to transmit a detection signal to the bezel and receive a reflection signal of the transmitted detection signal; and a controller configured to determine a touch position of a user on the bezel based on time taken from a point of time where the at least one signal transceiver transmits the detection signal to a point of time where the at least one signal transceiver receives the reflection signal.

18 Claims, 13 Drawing Sheets

(56) References Cited

U.S. PATENT DOCUMENTS

| | | |
|---|---|---|
| 2004/0168516 A1 | 9/2004 | Kent |
| 2005/0146511 A1* | 7/2005 | Hill ....................... G06F 3/0436 345/173 |
| 2006/0238517 A1 | 10/2006 | King et al. |
| 2011/0234545 A1 | 9/2011 | Tanaka et al. |
| 2013/0234994 A1* | 9/2013 | Hecht ................... G06F 3/0433 345/177 |
| 2014/0289668 A1 | 9/2014 | Mavrody |
| 2016/0357279 A1 | 12/2016 | Choi et al. |
| 2017/0052618 A1 | 2/2017 | Lee et al. |
| 2019/0243047 A1* | 8/2019 | Khajeh ................ G02B 5/3041 |
| 2019/0346969 A1* | 11/2019 | Yip ....................... G06F 3/0436 |

FOREIGN PATENT DOCUMENTS

| | | |
|---|---|---|
| KR | 10-2016-0074978 | 6/2016 |
| KR | 10-2017-0081391 | 7/2017 |

OTHER PUBLICATIONS

Extended European Search Report dated Apr. 24, 2020 in European Patent Application No. 18840241.6.

* cited by examiner

US 11,023,087 B2

DISPLAY APPARATUS AND CONTROL METHOD FOR DETERMINING TOUCH POSITION ON BEZEL

CROSS-REFERENCE TO RELATED THE APPLICATION

This application is based on and claims priority under 35 U.S.C. § 119 to Korean Patent Application No. 10-2017-0098494, filed on Aug. 3, 2017 in the Korean Intellectual Property Office, the disclosure of which is incorporated by reference herein in its entirety.

BACKGROUND

Field

Apparatuses and methods consistent with the present disclosure relate to a display apparatus having a display panel for displaying an image and a control method thereof, and more particularly to a display apparatus, of which a frame or a housing is formed as a bezel by supporting and surrounding an image display surface of a display panel and a preset operation is executed in response to a user's touch with the bezel, and a method of controlling the same.

Description of the Related Art

A display apparatus processes an image signal received from an external image source and displays it as an image on a display panel materialized by various types such as liquid crystal or the like. The display apparatus provided to a general user is achieved by a television (TV), a monitor, etc. For example, the display apparatus materialized as the TV applies various processes such as tuning, decoding, etc. to a broadcast signal received from a broadcasting station to thereby display an image of a broadcasting channel desired by a user, or processes image data received from a content provider through a network to thereby display a content image.

With a user's demand for a larger screen and technical development for meeting the demand, the screen of the display apparatus has become larger and larger. On the other hand, subsidiary elements other than the screen have become thinner or smaller in accordance with aesthetic points of view requested by a user. For example, the display panel has become larger, but a bezel around the display panel has become as narrow as unrecognizable when it is seen from a distance. The narrower the bezel is, the more difficult it may be to employ the same structure as the existing button part installed on the bezel.

For example, if a button part having a conventional physical or mechanical structure is applied to the narrow bezel, it may have negative effects on or be inharmonious with the whole design of the display apparatus from an aesthetic point of view. Therefore, the button part in this case has to be redesigned from the physical or mechanical button structure into a capacitive touch button structure or the like. Further, when a relatively narrow bezel structure is used to support a display panel having a large screen, the material of the bezel may cause a problem. The bezel made of polymethylmethacrylate (PMMA), polycarbonate (PC) or the like plastic material is not so durable to support the display panel having the large screen. For durability, a metallic material may be applied to the bezel.

By the way, the metallic material is not fundamentally adapted to a capacitive touch sensing structure since it absorbs electric charges well. Therefore, there are difficulties in applying a capacitive touch button to a metallic bezel. In a case where a button having a structure for sensing pressure is applied to the bezel, the bezel at a touch position has to be flexible to sense a touch input. Therefore, the metallic bezel is not suitable since it is inflexible. Further, a plastic material may be inflexible like the metallic material. The pressure sensing structure is not adapted to this case.

Accordingly, there is a need of proposing a touch sensing structure adapted to a bezel under the condition that the bezel is made of various materials such as metal or the like and has become thinner with a relatively narrow width.

SUMMARY

In accordance with an aspect of the disclosure, there is provided a display apparatus including: a display; a bezel extended along at least a portion of an edge of the display and configured to cover the edge of the display; at least one signal transceiver configured to transmit a detection signal to the bezel and receive a reflection signal of the transmitted detection signal; and a controller configured to determine a touch position of a user on the bezel based on an amount of taken from a point of time where the at least one signal transceiver transmits the detection signal to a point of time where the at least one signal transceiver receives the reflection signal. Thus, the display apparatus has a user's touch input structure adapted to the bezel made of metal or the like sturdy material to support a display panel of a large screen.

The controller may determine a point of time at which the reflection signal received in the at least one signal transceiver is changed in strength due to a user's touch, and may determine the touch position based on the signal change point of time.

The controller may determine a point of time, at which the reflection signal has strength higher than a preset first threshold, and determines the touch position based on the signal change point of time.

The controller may determine a position of the bezel corresponding to the signal change point of time as the touch position which is a position between a first position of the bezel where the at least one signal transceiver transmits the detection signal and a second position of the bezel where the reflection signal is transmitted toward the at least one signal transceiver.

The controller may obtain a value by dividing an amount of time taken from a point of time at which the touch causes the signal change by an amount of time taken from a point of time at which the second position causes the signal changed, and may multiply a distance between the first position and the second position by the obtained value so as to determine a distance from the first position to the touch position.

The controller may determine that the user touches the bezel when the reflection signal generated at the second position is more dampened than a preset second threshold.

The controller may determine the signal change point of time caused by the user's touch based on a difference between a first reflection signal detected with the user's touch and a second reflection signal previously stored without the user's touch.

The controller may determine a peak within a section where a signal of showing the difference between the first reflection signal and the second reflection signal is higher than a preset third threshold, may apply an envelope to a section of a waveform rising toward the peak, and may determine that the user's touch is performed at a point of time corresponding to a point where the envelope has a level of '0'.

The at least one signal transceiver may oscillate in response to an applied electric signal so as to transmit the detection signal including a Lamb wave to the bezel.

The at least one signal transceiver may operate by alternating between a driving mode to transmit the detection signal and a receiving mode to receive the reflection signal of the detection signal transmitted in the driving mode.

In accordance with an another aspect of the disclosure, there is provided a method of controlling a display apparatus, the method including: by at least one signal transceiver, transmitting a detection signal to a bezel which is extended along at least a portion of an edge of a display and covers the edge of the display; by the at least one signal transceiver, receiving a reflection signal of the transmitted detection signal; and determining a touch position of a user on the bezel based on an amount of time taken from a point of time where the at least one signal transceiver transmits the detection signal to a point of time where the at least one signal transceiver receives the reflection signal.

The determining of the touch position may include determining a point of time at which the reflection signal received in the at least one signal transceiver is changed in strength due to a user's touch, and determining the touch position based on the signal change point of time.

The determining of the touch position may include determining a point of time, at which the reflection signal has strength higher than a preset first threshold, and determining the touch position based on the signal change point of time.

The determining of the touch position may include determining a position of the bezel corresponding to the signal change point of time as the touch position which is a position between a first position of the bezel where the at least one signal transceiver transmits the detection signal and a second position of the bezel where the reflection signal is transmitted toward the at least one signal transceiver.

The determining of the touch position may include obtaining a value by dividing an amount of time taken from a point of time at which the touch causes the signal change by an amount of time taken from a point of time at which the second position causes the signal changed, and multiplying a distance between the first position and the second position by the obtained value so as to determine a distance from the first position to the touch position.

The method may further include determining that the user touches the bezel when the reflection signal generated at the second position is more dampened than a preset second threshold.

The determining of the touch position may include determining the signal change point of time caused by the user's touch based on a difference between a first reflection signal detected with the user's touch and a second reflection signal previously stored without the user's touch.

The determining of the touch position may include determining a peak within a section where a signal of showing the difference between the first reflection signal and the second reflection signal is higher than a preset third threshold, applying an envelope to a section of a waveform rising toward the peak, and determining that the user's touch is performed at a point of time corresponding to a point where the envelope has a level of '0'.

The at least one signal transceiver may oscillate in response to an applied electric signal so as to transmit the detection signal including a Lamb wave to the bezel.

The signal transceiver may operate alternating, by the at least one signal transceiver between a driving mode to transmit the detection signal and a receiving mode to receive the reflection signal of the detection signal transmitted in the driving mode.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF EXEMPLARY EMBODIMENTS

Below, exemplary embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the exemplary embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Figure 1:
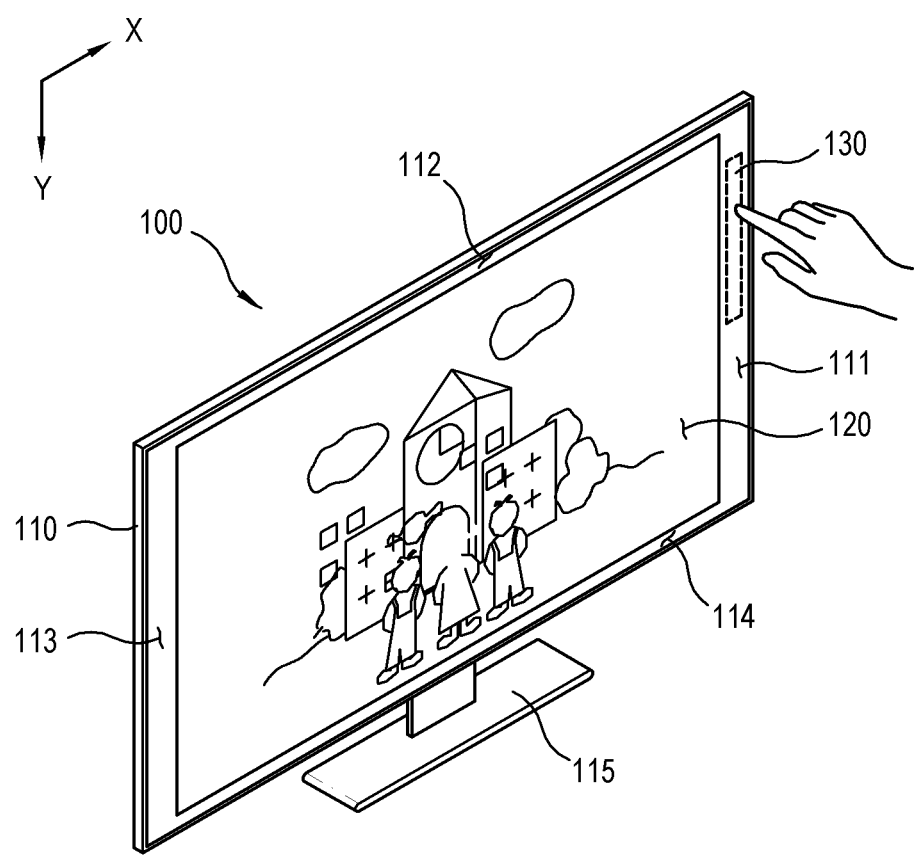
FIG. 1 is a perspective view of a display apparatus according to one embodiment of the disclosure.

FIG. 1 is a perspective view of a display apparatus according to one embodiment of the disclosure;

As shown in FIG. 1, a display apparatus 100 according to the disclosure may be materialized by various kinds of apparatuses without limitations. For example, a television (TV) will be described as the display apparatus 100 in this embodiment. However, the disclosure may be applied to various kinds of display apparatuses 100 such as a monitor for a computer, an electronic frame, a video wall, a multimedia player, a tablet computer, a mobile display apparatus, etc.

In terms of an external structure, the display apparatus 100 includes a housing 110, and a display panel 120 supported in the housing 110 and displaying an image. In case of a stand type, the housing 110 of the display apparatus 100 may be supported by a stand 115. In case of a wall-mount type, the housing 110 may be mounted to a wall without the stand 115. Since the housing 110 is opened at a front side to show a user the display panel 120, the housing 110 supports the display panel 120 while surrounding the edges of the display panel 120 in up, down, left and right, i.e. four directions. End portions of the housing 110 surrounding the edges of the display panel 120 in the four directions will be called bezels 111, 112, 113, and 114.

The bezels 111, 112, 113 and 114 are arranged to form a rectangular ring shape, including left and right bezels 111 and 113 extended in a vertical direction, i.e. a Y-direction, and up and down bezels 112 and 114 extended in a horizontal direction, i.e. an X-direction. In this embodiment, the bezels 111, 112, 113 and 114 are provided to each have a narrower width than a conventional one, and made of metal or the like strong material to support the display panel 120 even though the display panel 120 has a large screen. Of course, the material of the bezels 111, 112, 113 and 114 is not limited to the metal, and may include various materials such as plastic, glass, ceramic, etc. as long as its strength and hardness are secured.

The bezels 111, 112, 113 and 114 are provided with an input section 130 for sensing a user's touch input and generating an input signal. With this, a user touches the input section 130 provided on a certain area of the bezels 111, 112, 113 and 114, thereby setting operations of the display apparatus 100.

Below, a structure of the input section 130 installable on the bezels 111, 112, 113 and 114 in this embodiment will be described.

Figure 2:
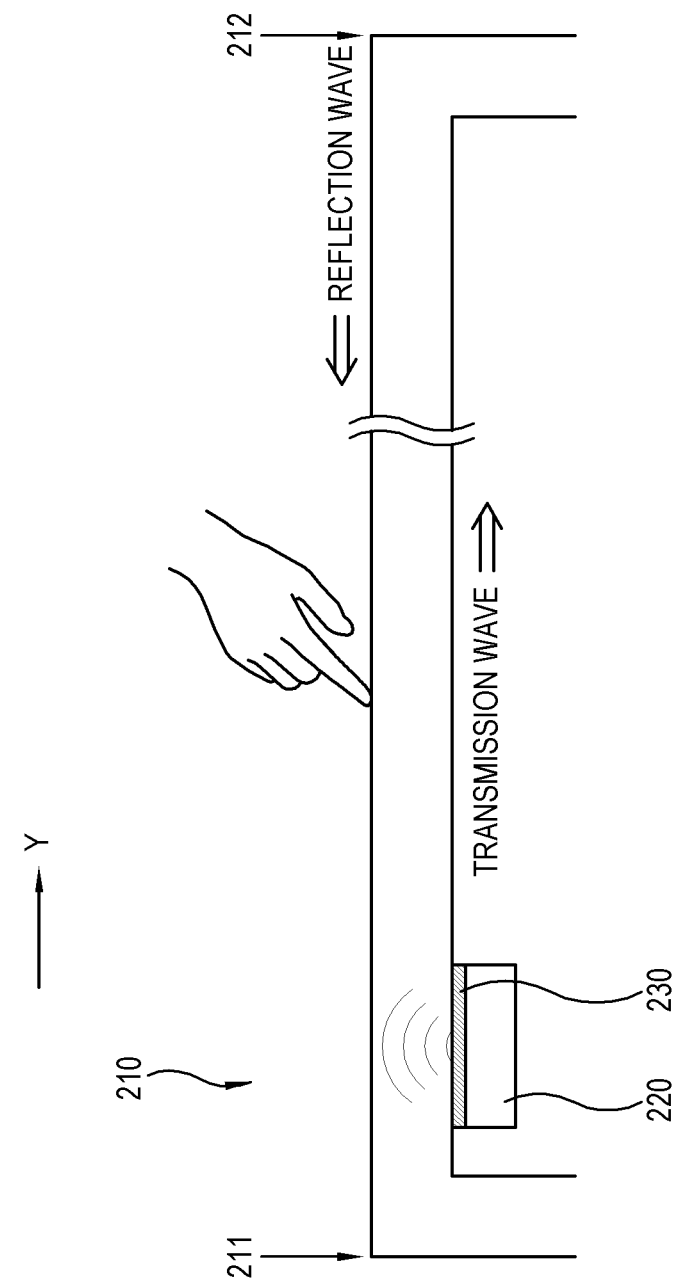
FIG. 2 illustrates an example that a signal transceiver is installed at a bezel in a display apparatus according to one embodiment of the disclosure.

FIG. 2 illustrates an example that a signal transceiver is installed at a bezel in a display apparatus according to one embodiment of the disclosure;

As shown in FIG. 2, a bezel 210 is extended in one direction. The bezel 210 in this embodiment is extended in the Y direction by way of example, but may be extended in the X direction as shown in FIG. 1. The bezel 210 in this embodiment may be one among the four bezels corresponding to the four directions shown in FIG. 1. In FIG. 2, an upper surface of the bezel 210 corresponds to an outer side of the display apparatus to be touched by a user, and a lower surface of the bezel 210 corresponds to an inner side of the display apparatus. Both end portions 211 and 212 of the bezel 210 correspond to vertexes of the display apparatus as positions of FIG. 1 where two bezels perpendicular to each other meet.

According to this embodiment, a signal transceiver 220 for generating and receiving a radio wave is installed at a position adjacent to a first end portion 211 of the bezel 210 on the inner side of the display apparatus, i.e. the lower surface of the bezel 210. The signal transceiver 220 may operate in either of a driving mode where it oscillates based on an electric signal to transmit a radio wave to the bezel 210 or a receiving mode where it converts the received radio wave to be output as an electric signal. To this end, the signal transceiver 220 may be materialized as a transducer.

The transducer basically refers to a device that receives energy of a certain type, transforms it into energy of another type, and outputs the transformed energy. Therefore, the transducer may be variously achieved in accordance with the kinds of energy to be transformed. The transducer in this embodiment is provided for transformation between an electric signal and mechanical vibration. In other words, the transducer transforms a received electric signal into vibration and outputs the vibration, or transforms vibration into an electric signal and outputs the electric signal.

There are many kinds of transducers. Since a lead zirconate titanate (PZT) type transducer using ceramic has driving power stronger than that of a polyvinylidene fluoride (PVDF) type transducer shaped like a film, the PZT type transducer is adapted to the signal transceiver 220 in this embodiment rather than the PVDF type transducer.

This embodiment describes that one signal transceiver 220 is installed on the first end portion 211 of the bezel 210. Alternatively, it may be designed to install two or more signal transceivers on each bezel. Here, one bezel 210 refers to one bezel extended in one direction among four bezels extended in the up, down, left and right, i.e. four directions of the display apparatus. In other words, one bezel 210 refers to a bezel extended along one edge among four edges of the display apparatus. Descriptions about two or more signal transceivers 220 installed on the bezel 210 will be made later.

The signal transceiver 220 alternately operates between a driving mode and a receiving mode as time goes on. The signal transceiver 220 operating in the driving mode oscillates based on a received electric signal, thereby applying mechanical vibration to the bezel 210. A detection signal of a transmission wave generated by the vibration moves toward a second end portion 212 of the bezel 210 along the bezel 210, and the transmission wave is changed into a reflection signal of a reflection wave after meeting the second end portion 212 of the bezel 210 and then moves toward the first end portion 211 of the bezel 210.

After applying the mechanical vibration to the bezel 210, the signal transceiver 220 is switched over to the receiving mode. The signal transceiver 220 in the receiving mode senses the reflection wave, converts it into an electric signal, and outputs the electric signal. Then, the signal transceiver 220 is switched over to the driving mode, and repeats the foregoing processes.

A coupling member 230 couples the signal transceiver 220 to the bezel 210. The kind or type of coupling member 230 is not limited to one, and the coupling member 230 may be for example achieved by an adhesive type using a double-sided tape, a fastening type using a screw, a holding type using a hook structure, etc. Among them, the adhesive type is better to transfer the vibration from the signal transceiver 220 to the bezel 210.

The coupling member 230 of the adhesive type may include an epoxy resin. In this case, the vibration absorbed in the coupling member 230 is minimized to thereby improve a sensing efficiency of the signal transceiver 220.

With this structure, the signal transceiver 220 continuously performs a process of measuring time taken from transmission of the transmission wave to reception of the reflection wave. In this case, when a user touches a certain position on the bezel 210, the signal transceiver 220 senses the reflection wave corresponding to the touch position. In this embodiment, the display apparatus determines the touch position on the bezel 210 by measuring the reflection wave caused by a user's touch based on time. Detailed descriptions about the determination of the touch position will be made later.

Thus, the display apparatus in this embodiment can employ metal or the like material inadequate for the capacitive touch sensor, and have a structure in which a touch is easily sensed on the bezel 210 having a relatively narrow width.

Various kinds of radio waves may be used as the transmission wave transmitted from and the reflection wave received in the signal transceiver 220. In this embodiment, a Lamb wave is used as the radio wave. The Lamb wave is also called a plate wave. The Lamb wave is a radio wave that propagates inside a thin elastic body, and is generated under conditions of a specific frequency, a specific incident angle, and a specific thickness of material. To generate the Lamb wave, the signal transceiver 220 makes a longitudinal wave be obliquely incident to the surface of the bezel 210. The obliquely incident longitudinal wave propagates while being repetitively reflected on the surfaces of the bezel 210, and thus a longitudinal wave and a transverse wave are mixed. Typically, the longitudinal wave and the transverse wave are interfered with each other and vanished in a thin plate, and therefore the Lamb wave is generated only at a specific incident angle where it is not vanished. The reason why the Lamb wave is used in this embodiment is because the bezel 210 is shaped like a thin plate and it is easy to sense and measure a radio wave propagating inside the bezel 210. The signal transceiver 220 oscillates at a frequency of from 30 kHz to several hundreds of kHz, thereby generating the Lamb wave on the surface of the bezel 210.

By the way, the signal transceiver 220 does not have to be adjacent to the first end portion 211 or the second end portion 212 of the bezel 210. For example, the signal transceiver 220 may be installed at various positions such as the center of the bezel 210.

According to this embodiment, the touch position is estimated based on time taken from a point of time where the signal transceiver 220 transmits the transmission wave to the bezel 210 by vibration to a point of time of sensing the reflection wave. By the way, when the touch position is too close to the signal transceiver 220, time taken between the point of time of generating the vibration in the signal transceiver 220 and the point of time of returning the reflection wave caused by a user's touch to the signal transceiver 220 is very short. The shorter such a taken time is, the less reliable the determination at the point of time of generating the reflection wave is. Therefore, the signal transceiver 220 is installed at a predetermined distance or more from a position to be typically touched by a user. By the way, the position to be typically touched by a user is the center portion of the bezel 210 or is close to the center portion rather than the first end portion 211 or the second end portion 212 of the bezel 210. Taking these points into account, the signal transceiver 220 is installed at a position near the first end portion 211 or the second end portion 212 of the bezel 210.

Below, elements for controlling the signal transceiver 220 will be described.

Figure 3:
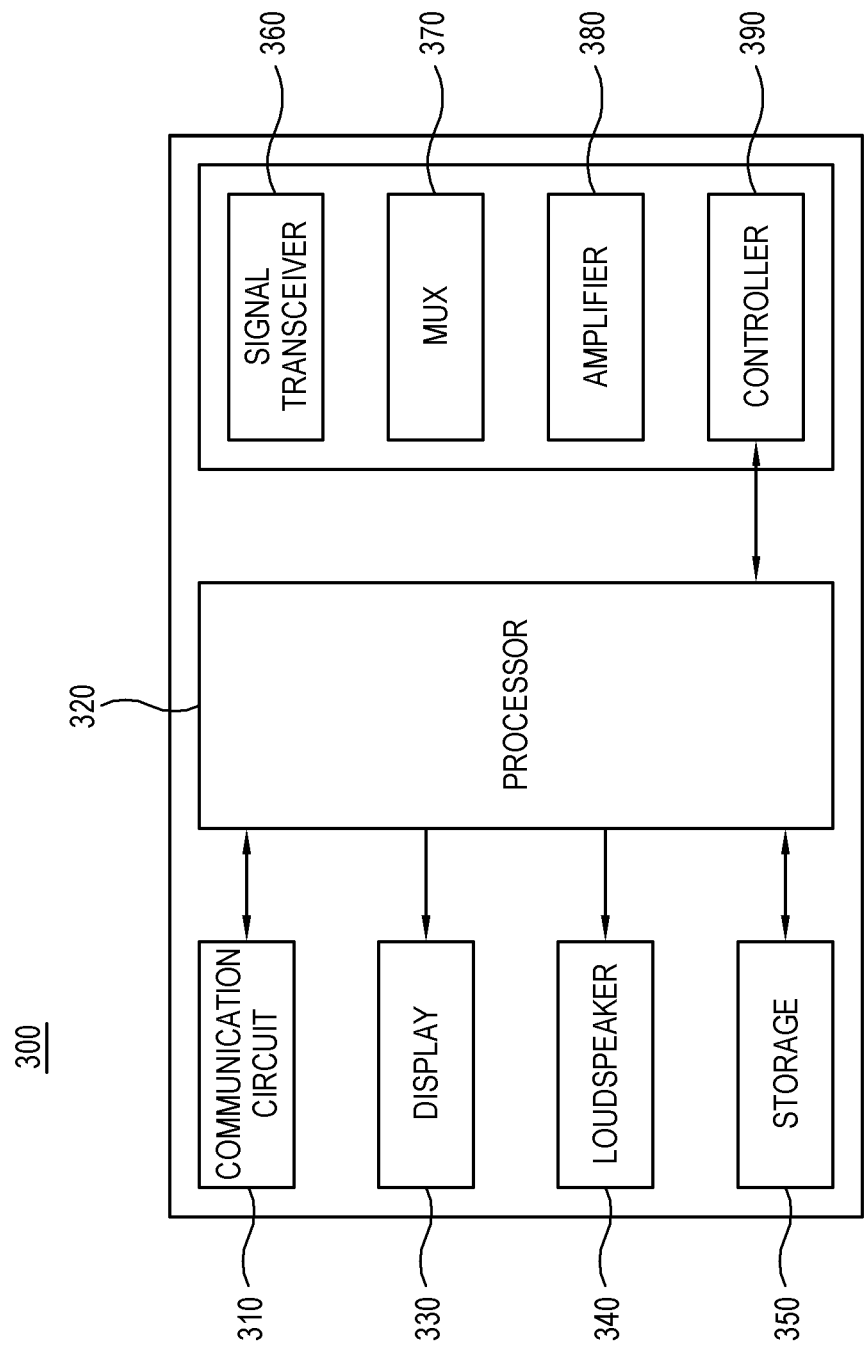
FIG. 3 is a block diagram of a display apparatus according to one embodiment of the disclosure.

FIG. 3 is a block diagram of a display apparatus according to one embodiment of the disclosure.

As shown in FIG. 3, a display apparatus 300 includes a communication circuit 310 configured to perform communication with an external device such as a content source, a broadcasting transmitter, etc.; a processor 320 configured to process a content signal received through the communication circuit 310; a display 330 configured to display an image based on video data of the content signal processed by the processor 320; a loudspeaker 340 configured to output a sound based on audio data of the content signal processed by the processor 320; and a storage 350 configured to store data.

The communication circuit 310 includes a data input interface where communication chipsets, communication modules or ports and the likes respectively corresponding to various kinds of communication protocols are combined. The communication circuit 310 is basically provided to receive a signal or data from the outside, but not limited thereto. Alternatively, the communication circuit 310 may perform interactive communication. The communication circuit 310 may for example include at least one among elements such as an antenna module for receiving a radio frequency (RF) broadcast signal, an Ethernet module for receiving packet data from the Internet by a wire, a wireless communication module for wirelessly receiving the packet data, and a connection port to which an external memory device such as a universal serial bus (USB) memory device is connected.

The processor 320 processes a content signal received in the communication circuit 310 so that content can be reproduced. The processor 320 separates the content signal into a video component and an audio component, and processes a content image to be displayed on a display 330 and a content sound to be output through the loudspeaker 340. The processor 320 includes a hardware processor materialized with a chipset, a buffer, a circuit and the like mounted to a printed circuit board, and may be designed as a system on chip (SoC).

The processor 320 includes chipset modules corresponding to various processes, such as a demultiplexer, a decoder, a scaler, an audio digital signal processor (DSP), an amplifier, a central processing unit (CPU), a microprocessor, etc., and some among them may be materialized as an SoC. For example, the demultiplexer, the decoder, the scaler and the like video processing modules and the CPU are integrated into a video processing SoC, and the audio DSP and the amplifier may be materialized as a chipset separately from the SoC.

The display 330 displays an image based on a video signal on an effective screen, and includes a display panel having a light receiving structure such as a liquid crystal display (LCD) type or a self-emissive structure such as an organic light emitting diode (OLED) type. Further, the display 330 may include subsidiary elements in addition to the display panel in accordance with the types of display panel. For example, the display 330 may include an LCD panel, a backlight unit for emitting light to the LCD panel, a panel driving substrate for driving liquid crystal of the LCD panel.

The loudspeaker 340 outputs a sound based on an audio signal. The loudspeaker 340 includes a unit loudspeaker provided corresponding to audio data of a certain audio channel, and may include a plurality of unit loudspeakers respectively provided corresponding to the audio data of a plurality of audio channels.

The storage 350 stores various pieces of data. In the storage 350, data is read, recorded, modified, deleted and updated by the processor 320. The storage 350 includes a flash memory, a hard disk drive, a solid state drive and the like nonvolatile memory in which data is retained regardless of whether the display apparatus 300 is powered on or off; and a buffer, a random access memory (RAM) and the like volatile memory in which data is temporarily loaded to be processed by the processor 320.

With this structure, the display apparatus 300 according to this embodiment includes additional elements as follows.

The display apparatus 300 includes a signal transceiver 360, a multiplexer (MUX) 370, an amplifier 380, and a controller 390. The MUX 370 and the amplifier 380 may be designed to be optionally employed, and the controller 390 may be designed to be integrated into the processor 320. In this embodiment, the MUX 370 and the amplifier 380 are employed, and the controller 390 is provided separately from the processor 320. However, it will be appreciated that these designs are not construed as limiting this embodiment.

The signal transceiver 360 operates alternately switching over between the driving mode and the receiving mode as described above. The signal transceiver 360 vibrates based on an electric signal in the driving mode and thus applies the Lamb wave to the bezel. Further, the signal transceiver 360 converts a reflection wave sensed in the receiving mode into an electric signal and outputs the electric signal. In this embodiment, the signal transceiver 360 operates switching over between the driving mode and the receiving mode, but not limited thereto. Alternatively, the signal transceiver for the driving mode and the signal transceiver for the receiving mode may be separately provided.

In transmitting the Lamb wave, the signal transceiver 360 applies a plurality of pulses to be different in strength from one another. Thus, it is possible to more easily recognize the reflection wave sensed in the signal transceiver 360.

The MUX 370 is applied when the signal transceiver 360 is provided to switch over between the driving mode and the receiving mode. The MUX 370 allows an electric signal to be applied to the signal transceiver 360 when the signal transceiver 360 operates in the driving mode, but blocks the electric signal from being applied to the signal transceiver 360 when the signal transceiver 360 operates in the receiving mode. In other words, the MUX 370 functions as a kind of switch. The MUX 370 is not used when the signal transceiver for the driving mode and the signal transceiver for the receiving mode are separately provided.

The amplifier 380 serves to amplify a signal. The amplifier 380 is provided for at least one of the driving mode and the receiving mode, and amplifies an electric signal input to the signal transceiver 360 or output from the signal transceiver 360.

The controller 390 is materialized by a microprocessor or the like. The controller 390 generates a driving waveform and applies it to the signal transceiver 360, so that the signal transceiver 360 oscillates a waveform corresponding to the driving waveform. The waveform may be generated by a digital-to-analog converter (DAC) or pulse width modulation (PWM). The waveform may be sensed by an analog-to-digital converter (ADC).

With this structure, the controller 390 determines a touch position on the bezel, based on time taken between the first point of time where the signal transceiver 360 vibrates to generate the transmission wave and the second point of time where the reflection wave caused by a user's touch is sensed.

Figure 4:
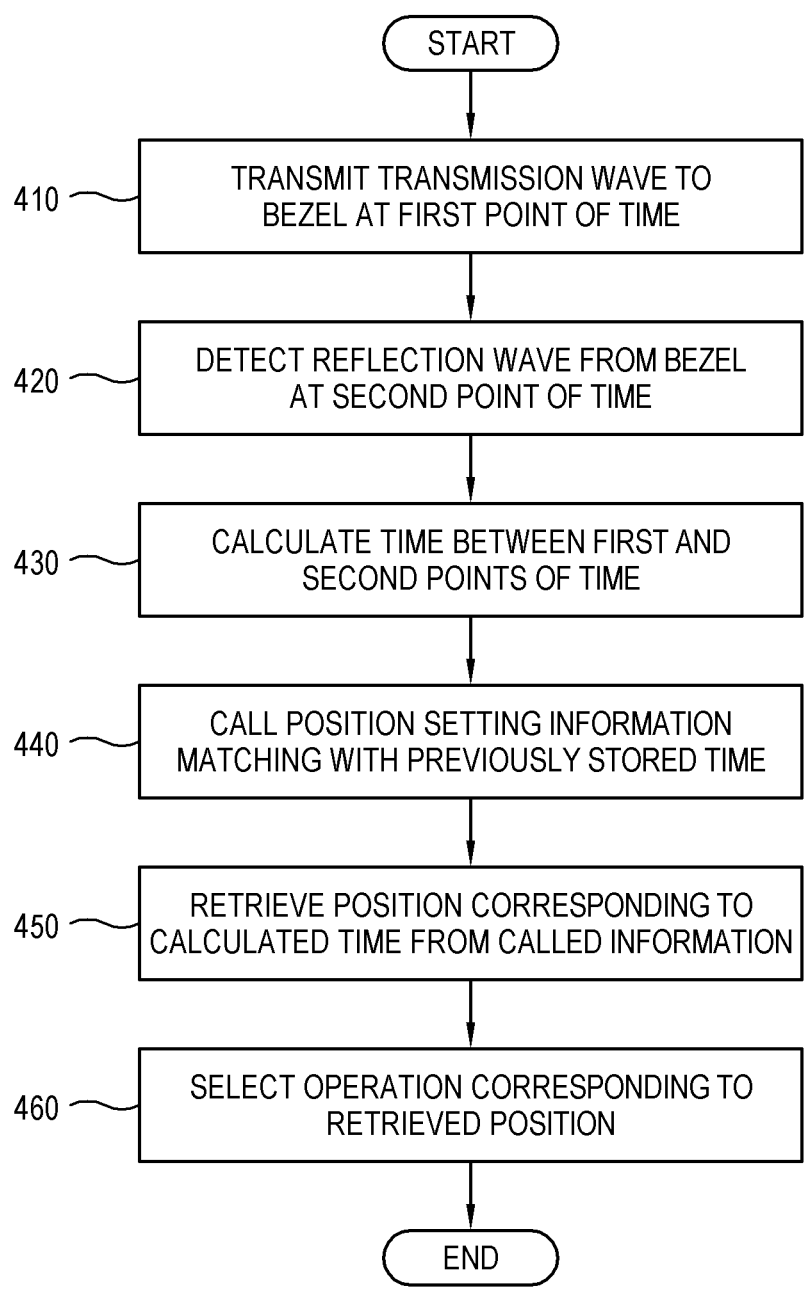
FIG. 4 is a flowchart of showing a method of determining a touch position on a bezel in a display apparatus according to one embodiment of the disclosure.

FIG. 4 is a flowchart of showing a method of determining a touch position on a bezel in a display apparatus according to one embodiment of the disclosure;

As shown in FIG. 4, at operation 410 the display apparatus operates the signal transceiver in the driving mode and applies an electric signal to the signal transceiver so that the signal transceiver can vibrate to apply the transmission wave to the bezel at the first point of time.

At operation 420 the display apparatus switches the signal transceiver over to the receiving mode so that the signal transceiver can sense the reflection wave from the bezel at the second point of time.

At operation 430 the display apparatus calculates time taken between the first point of time and the second point of time.

At operation 440 the display apparatus calls previously stored position setting information matching with time. Here, the position setting information matching with the time may be given in various forms. For example, the position setting information may be given in a table form or a preset mathematical expression. When it is given in the table form, the position setting information matching with the time includes a plurality of fields in which time taken between the point of time of generating the transmission wave and the point of time of sensing the reflection wave and a value of a position corresponding to the time are tabulated. The value of the position refers to a distance from a point where the signal transceiver generates vibration, i.e. a reference point when a point of generating the transmission is regarded as the reference point.

At operation 450 the display apparatus retrieves or acquires the position corresponding to the calculated time from the called information.

At operation 460 the display apparatus performs a preset operation corresponding to the retrieved position.

Thus, the display apparatus easily determines a position where a user's touch input is made on the bezel.

Below, it will be described that the display apparatus senses the reflection wave and determines time taken between the point of time of generating the transmission wave and the point of time of sensing the reflection wave.

Figure 5:
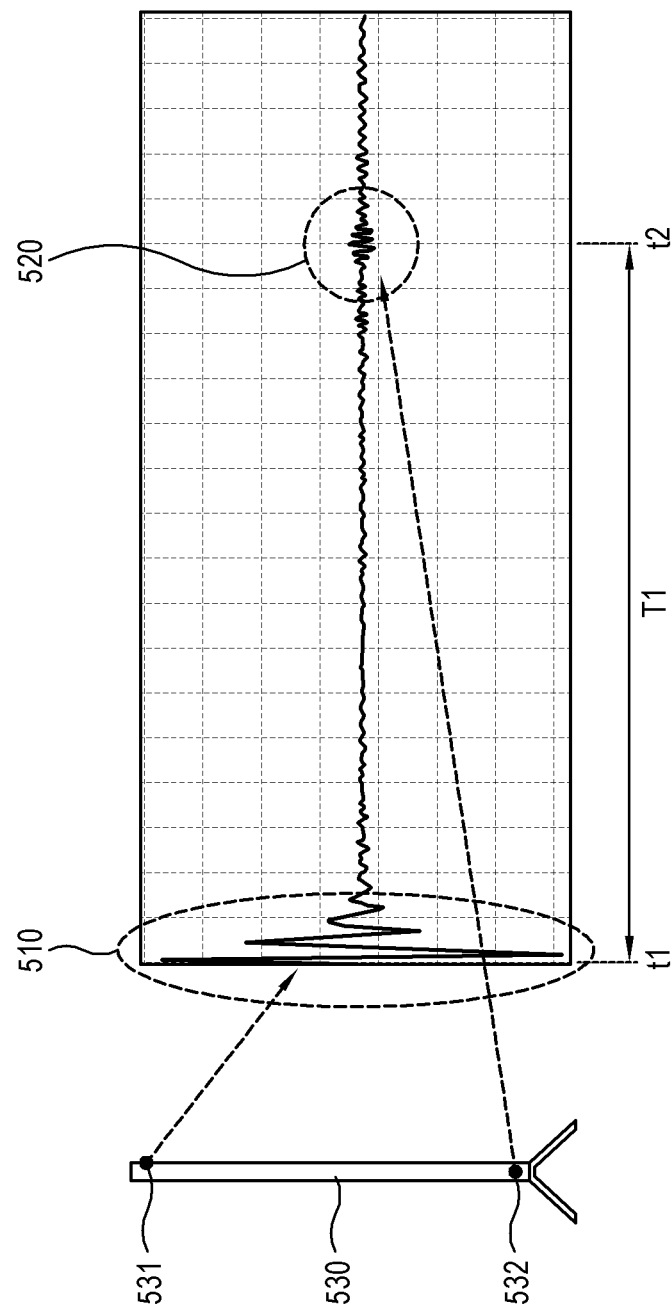
FIG. 5 is a graph of showing a time-domain waveform of a Lamb wave sensed when a user does not touch a bezel in a display apparatus according to one embodiment of the disclosure.

FIG. 5 is a graph of showing a time-domain waveform of a Lamb wave sensed when a user does not touch a bezel in a display apparatus according to one embodiment of the disclosure.

As shown in FIG. 5, the Lamb wave generated or sensed in the display apparatus may be represented in the graph of time versus strength. In this graph, an abscissa indicates time, and an ordinate indicates the strength of the Lamb wave, in which both abscissa and ordinate are not limited to specific units.

In the waveform of the graph, a portion 510 where the strength of the waveform largely fluctuates around the point of time t1 shows that the Lamb wave is generated as the transmission wave by the vibration of the signal transceiver. In other words, the point of time t1 indicates a point of time where the transmission wave is generated.

The waveform goes without large change in the strength of the waveform after the point of time t1, and then a portion 520, in which the strength of the waveform relatively largely increases and fluctuates, appears around the point of time t2. In other words, the waveform has strength lower than a preset threshold after the point of time t1, but has strength higher than the threshold when reaching the point of time t2.

When any touch has not been made on the bezel 530 in the state that the signal transceiver is installed on the first end portion 531 of the bezel 530, the point of time t2 is regarded as a state that the Lamb wave hits the second end portion 532 of the bezel 530 and comes back as the reflection wave. In other words, time T1 taken between the point of time t2 and the point of time t1 is equivalent to time taken by the Lamb wave in being reflected from the second end portion 532 of the bezel 530 and coming back to the signal transceiver installed in the first end portion of the bezel 530 in the state that a user's touch input is not made.

Therefore, when there are no substantive changes in the waveform while the time T1 elapses after the point of time of generating the transmission wave, the display apparatus determines that a user's touch input is not made.

Below, a case where a user's touch input is generated will be described.

Figure 6:
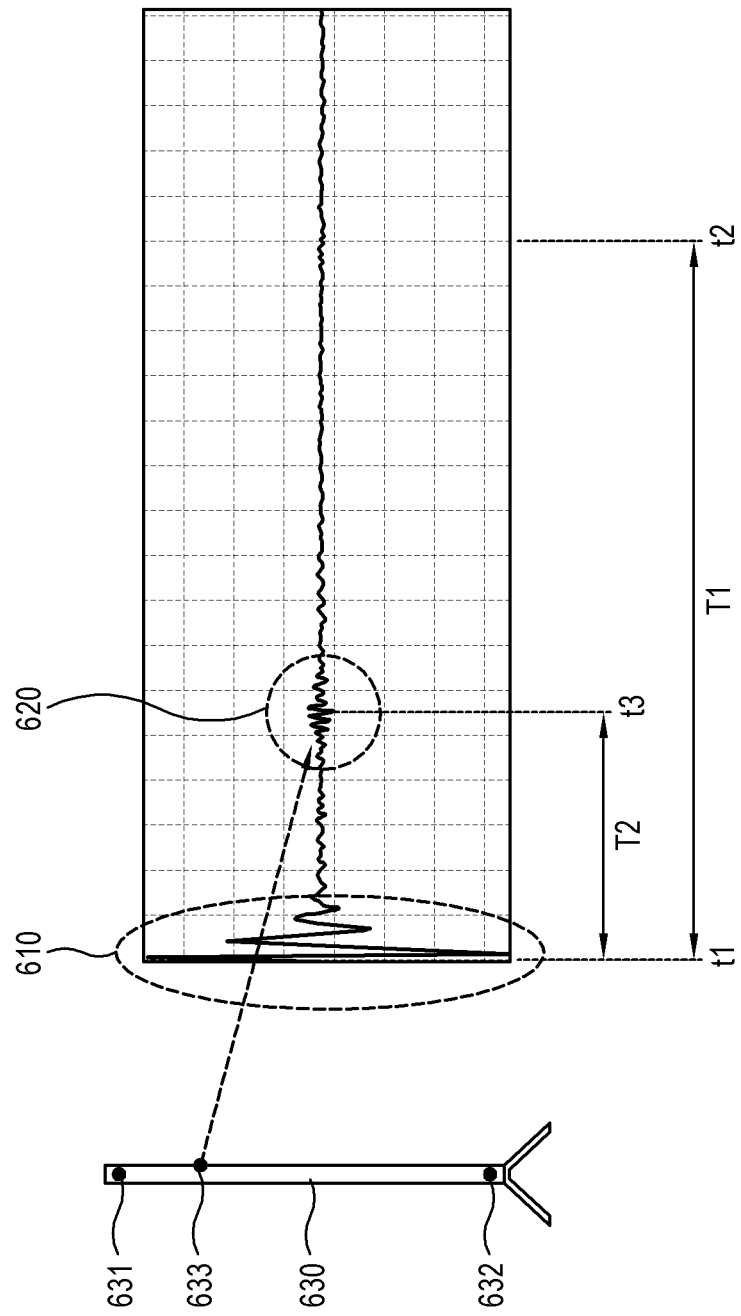
FIG. 6 is a graph of showing a time-domain waveform of a Lamb wave sensed when a user touches a bezel in a display apparatus according to one embodiment of the disclosure.

FIG. 6 is a graph of showing a time-domain waveform of a Lamb wave sensed when a user touches a bezel in a display apparatus according to one embodiment of the disclosure;

As shown in FIG. 6, in the waveform of the graph, a portion 610 where the strength of the waveform largely fluctuates around the point of time t1 shows that the Lamb wave is generated as the transmission wave a first end portion 631 of a bezel 630. In other words, the point of time t1 indicates a point of time where the transmission wave is generated like the foregoing point of time t1 of FIG. 5.

The waveform goes without large change in the strength of the waveform after the point of time t1, and then a portion 620, in which the strength of the waveform relatively largely increases and fluctuates, appears around a point of time t3. In other words, the waveform has strength lower than a preset threshold after the point of time t1, but has strength higher than the threshold when reaching the point of time t3.

As described above with reference to FIG. 5, the point of time t2 is equivalent to a state corresponding to a position of a second end portion 632 of the bezel 630. When any user's touch input is not generated, there will be no portions where the strength of the waveform is higher than the threshold for time T1 taken between the point of time t2 and the point of time t1.

On the other hand, as shown in FIG. 6, when a user touches a certain position 633 of the bezel 630, the Lamb wave propagating from the signal transceiver at the first end portion 631 of the bezel 630 to the second end portion 632 is reflected from the touch position 633 and returned to the signal transceiver. The signal transceiver senses change of the reflection wave at the point of time t3. Therefore, when time taken between the point of time t1 of generating the transmission wave and the point of time t3 of sensing the change of the reflection wave is equal to the time T2, the display apparatus determines that a user's touch input is made on a specific position 633 of the bezel 630.

Thus, the display apparatus measures time taken between the point of time of generating the lamb wave as the transmission wave and the point of time of sensing the Lamb wave as the reflection wave, and determines a position where a user's touch input is made on the bezel, based on the measured time.

The foregoing embodiments describe the method of determining a user's touch position on the bezel. Alternatively, it may be determined only whether a user touches the bezel or not without specifying the user's touch position. In this regard, descriptions will be made below.

Figure 7:
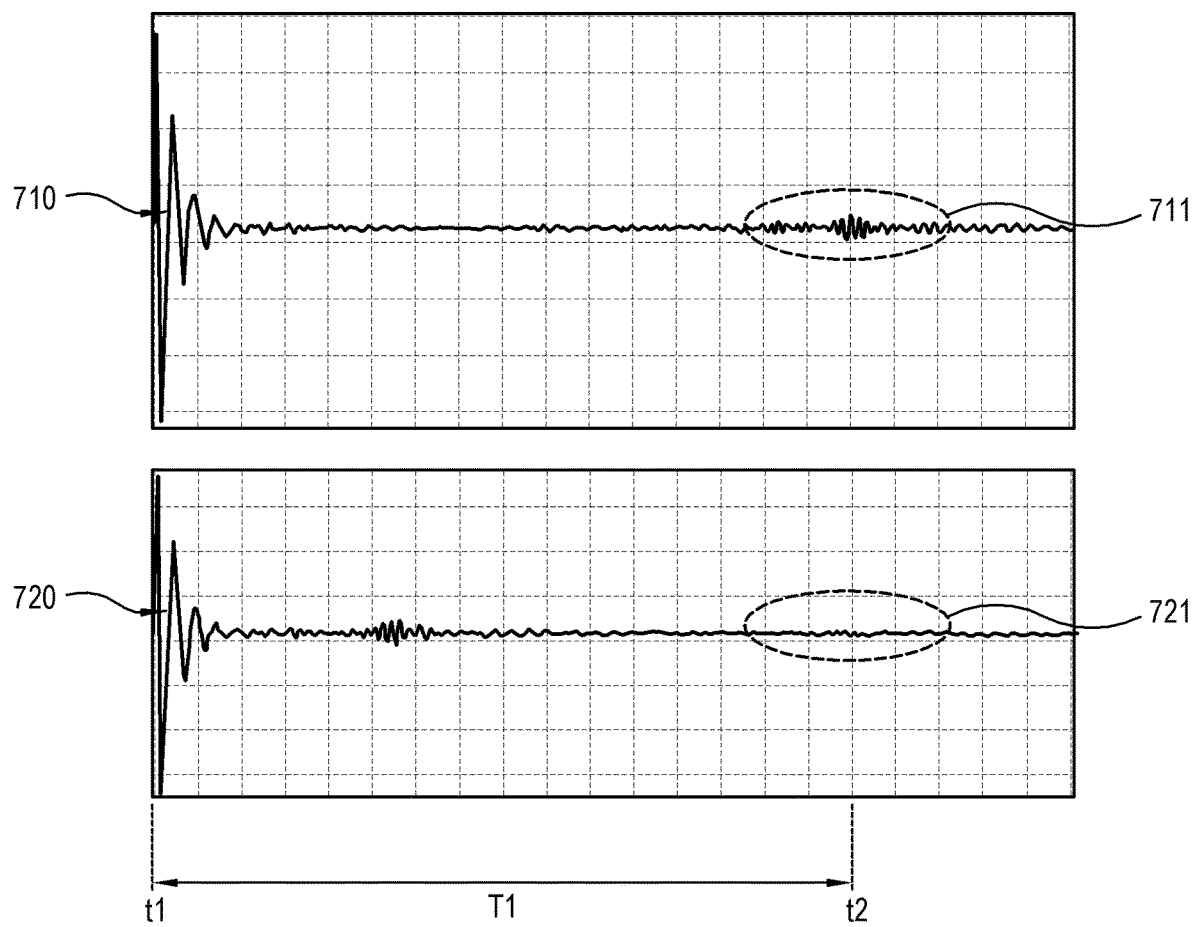
FIG. 7 is a graph of showing difference in waveform between reflection waves corresponding to a second end portion on a bezel in accordance with whether or not a user touches a bezel of a display apparatus according to one embodiment of the disclosure.

FIG. 7 is a graph of showing difference in waveform between reflection waves corresponding to a second end portion on a bezel in accordance with whether or not a user touches a bezel of a display apparatus according to one embodiment of the disclosure;

As shown in FIG. 7, the display apparatus determines waveforms 710 and 720 of the Lamb wave propagating within the bezel by the signal transceiver. FIG. 7 shows two waveforms 710 and 720, in which the upper waveform 710 indicates that a user does not touch the bezel, and the lower waveform 720 indicates that a user touches a predetermined position on the bezel. In this embodiment, the display apparatus determine only whether or not a user touches the bezel, but does not determine which position of the bezel is touched.

Let the point of time where the Lamb wave is generated by the signal transceiver arranged at the first end portion of the bezel be t1, the point of time where the Lamb wave is reflected from the second end portion of the bezel and sensed by the signal transceiver be t2, and time taken between the point of time t1 and the point of time t2 be T1.

When a user does not touch the bezel, a waveform 711 at the point of time t2 has strength higher than a preset threshold. Here, the threshold has been previously determined by experiments or the like. By the way, an oscillation signal is dampened when a human's hand touches metal or the like propagation medium. Therefore, when a user is touching the bezel, the oscillation of the Lamb wave propagating toward the second end portion of the bezel is dampened. The stronger a user presses the bezel, the more dampened the oscillation is.

In other words, when a user touches the bezel, a waveform 721 at the point of time t2 has strength lower than the threshold. At least, the strength of the waveform 721 at the point of time t2 while a user is touching the bezel is smaller than the corresponding strength of the waveform 711 while a user is not touching the bezel. This is because the oscillation propagating within the medium, i.e. the bezel is dampened by a user's touch. The higher the touch pressure of a user is, the more dampened the strength of the waveform 721 is.

Therefore, the display apparatus determines that a user touches the bezel when the reflection wave reflected and returned from the end of the bezel is substantially dampened. Specifically, the display apparatus determines that a user touches the bezel when strength of a waveform sensed at a point of time, in which time T1 taken until the Lamb wave is reflected from the end of the bezel and comes back to the signal transceiver is elapsed from the point of time of generating the Lamb wave, is lower than the threshold, but determines that a user does not touch the bezel otherwise. When a user does not touch the bezel, the strength of the reflection wave is higher than the threshold.

Thus, the display apparatus may determine only whether or not a user touches the bezel. With this determination, the display apparatus may perform a simple toggle switch-based operation. For example, the display apparatus performs an operation of switching over between system power-on or system power-off when it is determined that a user touches the bezel.

In the foregoing embodiments, one signal transceiver is installed in the bezel and operates alternately switching over between the driving mode and the receiving mode to generate and sense the Lamb wave. Alternatively, it may be designed to install and use two or more signal transceivers in the bezel. In this regard, embodiments will be described below.

Figure 8:
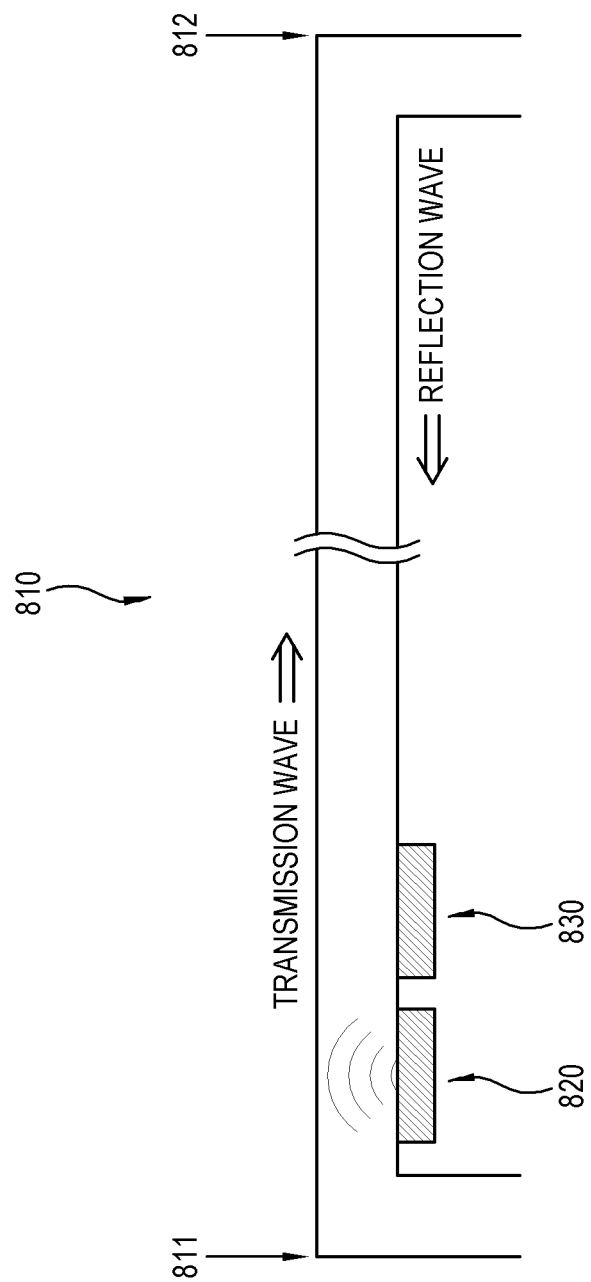
FIG. 8 illustrates an example that a signal transmitter and a signal receiver are installed in a bezel in a display apparatus according to one embodiment of the disclosure.

FIG. 8 illustrates an example that a signal transmitter and a signal receiver are installed in a bezel in a display apparatus according to one embodiment of the disclosure.

As shown in FIG. 8, a signal transmitter 820 and a signal receiver 830 are arranged at a position near a first end portion 811 of the bezel 810 on a lower surface of a bezel 810. In this embodiment, the signal transmitter 820 and the signal receiver 830 are basically similar to the signal transceiver of the foregoing embodiments, but share the roles of the signal transceiver of the foregoing embodiments between them. Here, the terms of the signal transmitter 820 and the signal receiver 830 are merely to divide the roles of the signal transceiver according to functions.

The signal transmitter 820 serves as the signal transceiver in the driving mode according to the foregoing embodiments, but the signal receiver 830 serves as the signal transceiver in the receiving mode according to the foregoing embodiments. In the foregoing embodiments, one signal transceiver is installed in the bezel and has to operate alternately switching over between the driving mode and the receiving mode so as to transmit and sense the Lamb wave. On the other hand, in this embodiment, two signal transceivers are employed. One of the signal transceivers is materialized as the signal transmitter 820 operating in the driving mode, and the other one is materialized as the signal receiver 830 operating in the receiving mode. Of course, the signal transceivers identically manufactured may be respectively designated for each individual mode, or the signal transmitter 820 and the signal receiver 830 may be differently manufactured and used according to functions.

The signal transmitter 820 vibrates the bezel 810 when an electric signal is received and thus generates the transmission wave in the bezel 810. The signal receiver 830 senses the reflection wave propagating in the bezel 810. There are no limits to positions where the signal transmitter 820 and the signal receiver 830 are arranged. However, the signal transmitter 820 and the signal receiver 830 are arranged at least near opposite ends 811 and 812 of the bezel 810 rather than the center of the bezel 810 since reliability of sensing the touch is deteriorated in case of touching the positions where the signal transmitter 820 and the signal receiver 830 are arranged.

To facilitate the touch sensing, the signal transmitter 820 and the signal receiver 830 have to be arranged together in the first end portion 811 of the bezel 810. When the signal transmitter 820 is arranged in the first end portion 811 of the bezel 810 and the signal receiver 830 is arranged in the second end portion 812 of the bezel 810, the transmission wave is detected by the signal receiver 830 before reaching the second end portion 812 of the bezel 810. Thus, it is complicated to detect the touch.

However, the signal transceivers may be respectively arranged at opposite ends of the bezel in accordance with operations. In this regard, an embodiment will be described below.

Figure 9:
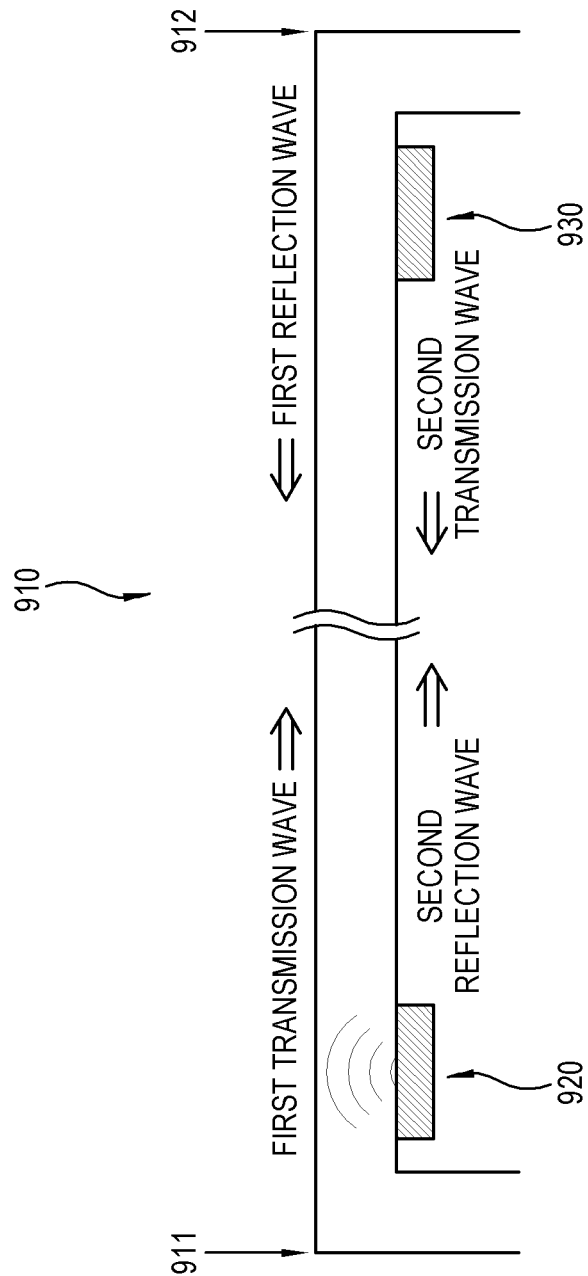
FIG. 9 illustrates another example that a signal transmitter and a signal receiver are installed in a bezel in a display apparatus according to one embodiment of the disclosure.

FIG. 9 illustrates another example that a signal transmitter and a signal receiver are installed in a bezel in a display apparatus according to one embodiment of the disclosure.

As shown in FIG. 9, two signal transceivers 920 and 930 are arranged in a bezel 910. A first signal transceiver 920 is arranged at a position near the first end portion 911 of the bezel 910, and a second signal transceiver 930 is arranged at a position near the second end portion 912 of the bezel 910. In terms of functions, the first signal transceiver 920 and the second signal transceiver 930 are substantially the same as the signal transceiver of the foregoing embodiments. The first signal transceiver 920 and the second signal transceiver 930 operate alternately switching over between the driving mode and the receiving mode.

Operational sequences of the first signal transceiver 920 and the second signal transceiver 930 are as follows. The first signal transceiver 920 applies a first transmission wave to the bezel 910 in the driving mode. The first transmission wave hits the second end portion 912 of the bezel 910 and becomes a first reflection wave. The first signal transceiver 920 detects the first reflection wave in the receiving mode. Next, the second signal transceiver 930 applies a second transmission wave to the bezel 910 in the driving mode. The second transmission wave hits the first end portion 911 of the bezel 910 and becomes a second reflection wave. The second signal transceiver 930 detects a second reflection wave in the receiving mode. Such a process is continuously repeated.

With this structure according to this embodiment, utilities are as follows. As described above, when a user touches a position near the signal transceiver, reliability of sensing such a touch is deteriorated. To enhance the reliability of sensing the touch by the signal transceiver, a user's touch position has to be at a predetermined distance or more from the signal transceiver. When a user touches a position around the first end portion 911 of the bezel 910 in the state that the signal transceiver is installed at only the first end portion 911 of the bezel 910 like that of the foregoing embodiment, it may be difficult to detect a touch on this position rather than the other positions of the bezel 910.

By the way, in this embodiment, the first signal transceiver 920 is distant from the second end portion 912 of the bezel 910, and the second signal transceiver 930 is distant from the first end portion 911 of the bezel 910. With the structure according to this embodiment, a touch on a position near the first end portion 911 of the bezel 910 is detected by the second signal transceiver 930 arranged in the second end portion 912 of the bezel 910, and a touch on a position near the second end portion 912 of the bezel 910 is detected by the first signal transceiver 920 arranged in the first end portion 911 of the bezel 910.

Thus, according to this embodiment, it is possible to cover a dead zone that may occur in the foregoing embodiments.

The display apparatus determines a touch position by measuring strength of a reflection wave in a time domain as described in the foregoing embodiments. In an ideal case, it is easy to determine a touch position since the strength of the reflection wave generated in the second end portion of the bezel and a user's touch position is relatively remarkably high. However, in accordance with the structures of the bezel, the reflection waves may be generated according to regions of the bezel in an initial state where a user does not make any touch.

For example, in a structure where the bezel is extended in one direction, a support or fastening structure may be placed in a certain region of the bezel, or a certain region of the bezel may be deformed. In the graph of the strength of the reflection wave varied in a time domain, the strength of the reflection wave increases corresponding to these regions, and it is therefore not easy for the display apparatus to detect the reflection wave generated at a user's touch position.

Below, one embodiment for making the display apparatus more easily determine a user's touch position will be described.

Figure 10:
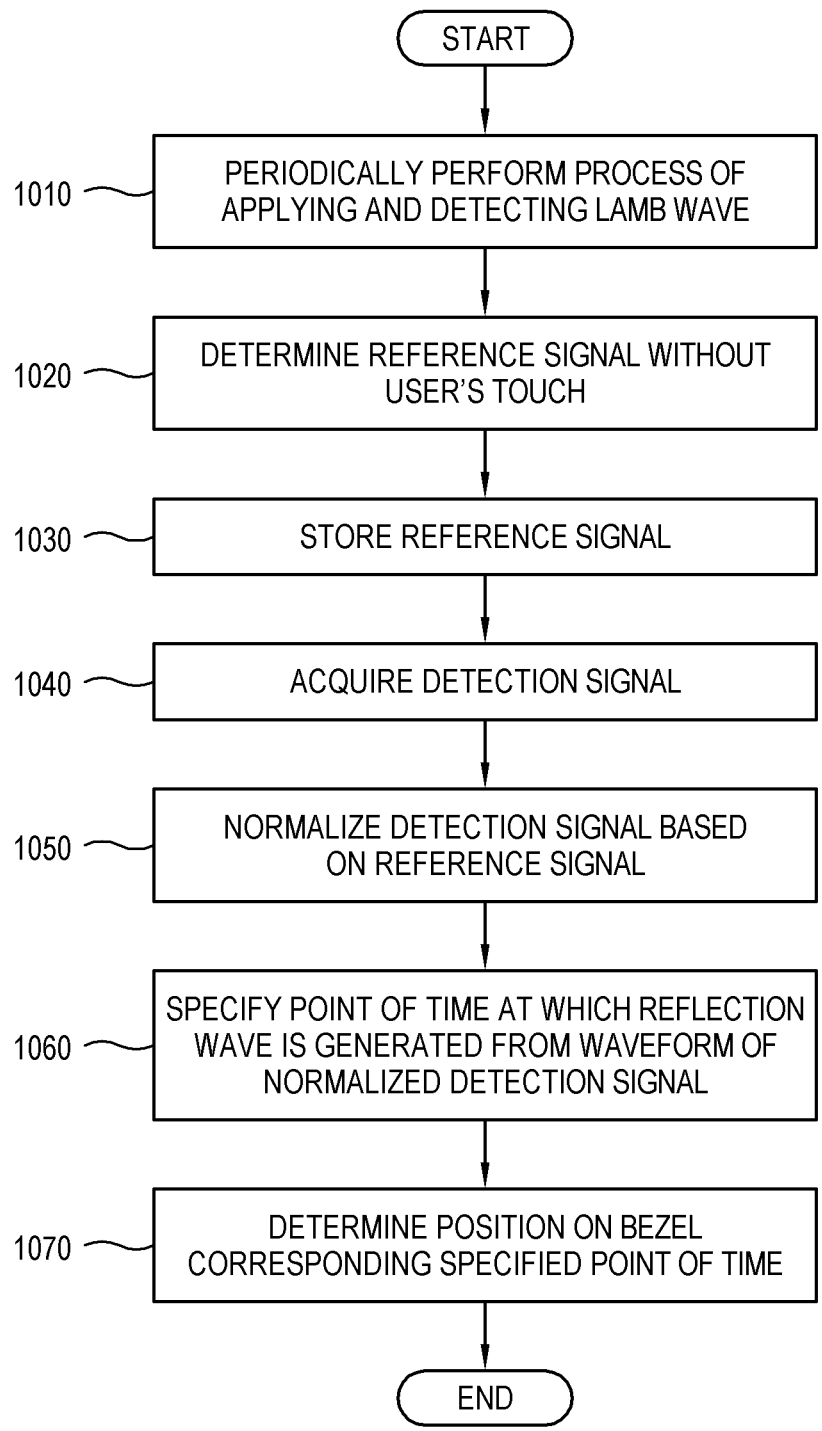
FIG. 10 is a flowchart of determining a touch position in a display apparatus according to one embodiment of the disclosure.

FIG. 10 is a flowchart of determining a touch position in a display apparatus according to one embodiment of the disclosure.

As shown in FIG. 10, at operation 1010 the display apparatus periodically performs a process of transmitting and sensing the Lamb wave.

At operation 1020 the display apparatus determines a reference signal of showing a state that senses no touches of a user, based on a periodically performed process. For example, it is expected that a waveform which appears the most times is equivalent to the reference signal as long as the process is performed sufficiently many times even though a point of time of sensing a touch of a user is present during the operation 1010. Further, the display apparatus may guide a user to be informed that the process of the operation 1010 is performed, through a user interface or the like, and do not touch the bezel.

At operation 1030 the display apparatus stores the reference signal. Here, the reference signal is periodically determined, so that a previously stored reference signal can be updated with a new reference signal.

At operation 1040, the display apparatus acquires a detection signal as the Lamb wave is applied and sensed. As described in the foregoing embodiments, the detection signal may be represented with a waveform in a time domain.

At operation 1050 the display apparatus normalizes the detection signal based on the reference signal. The normalization of the detection signal is basically achieved by subtracting components of the reference signal from the detection signal, but may be achieved in various alternative embodiments.

At operation 1060 the display apparatus specifies a point of time of generating the reflection wave from the waveform of the normalized detection signal. When the detection signal is represented with the waveform of the time domain, it is estimated that the reflection wave is generated at a point of time at which the sensitivity of the waveform is greater than a threshold.

At operation 1070 the display apparatus determines a position on the bezel corresponding to the specified point of time.

Thus, the display apparatus is capable of determining a touch position on the bezel capable of having various structures.

Below, descriptions will be made with regard to a method of determining a point of time, at which a reflection wave is generated, in order to determine a user's touch position based on the detection signal.

Figure 11:
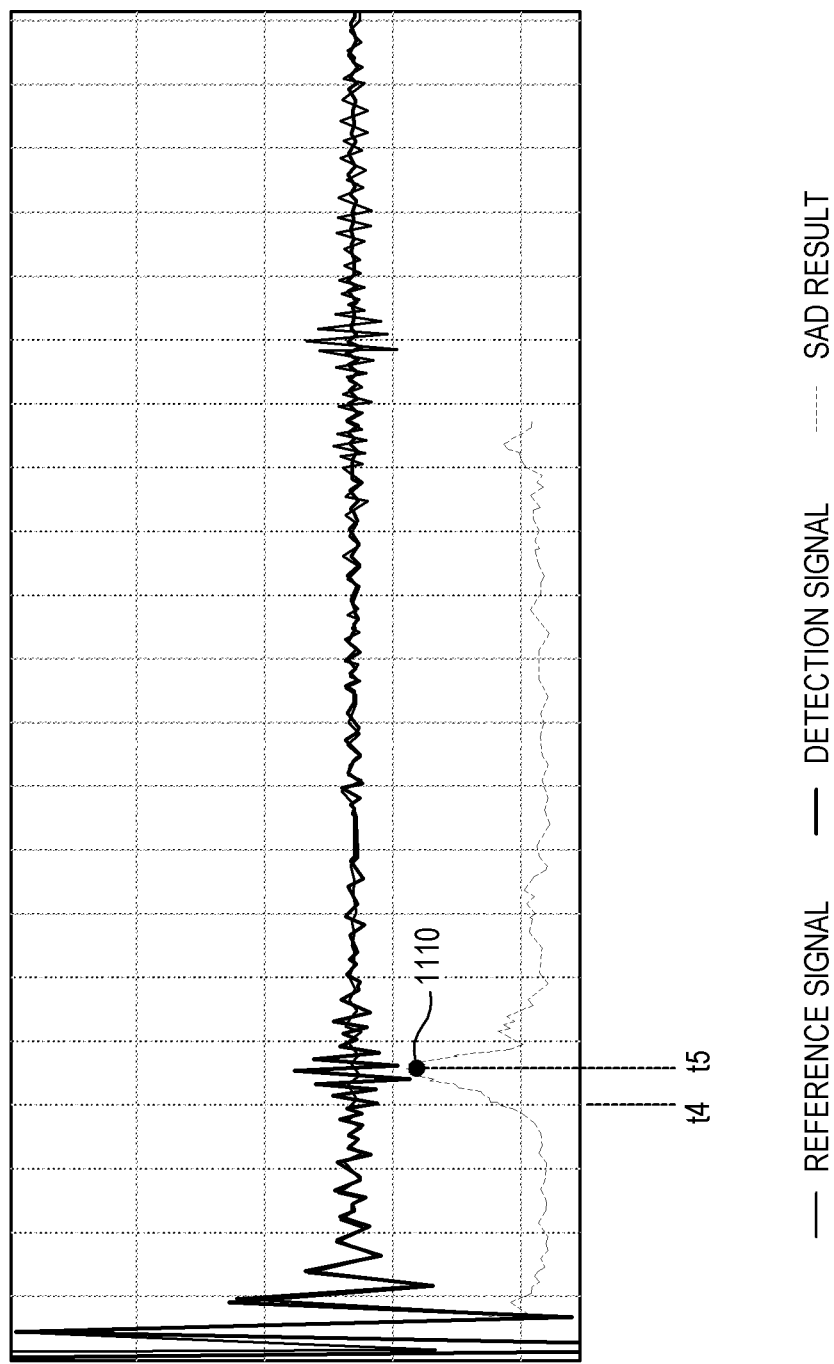
FIG. 11 is a graph of showing waveforms of a reference signal and a detection signal, and an absolute difference between them in a display apparatus according to one embodiment of the disclosure.

FIG. 11 is a graph of showing waveforms of a reference signal and a detection signal, and an absolute difference between them in a display apparatus according to one embodiment of the disclosure.

As shown in FIG. 11, a reference signal of a Lamb wave sensed without a user's touch and a detection signal of the Lamb wave sensed with a user's touch may be represented with waveforms in a time domain.

The display apparatus calculates a sum of absolute difference (SAD) between the reference signal and the detection signal. The absolute difference is a value taken from a difference between two variables regardless of signs. The display apparatus may represent the absolute difference between the reference signal and the detection signal at points of time with a kind of waveform, which is illustrated as an SAD result in FIG. 11.

The display apparatus may determine that a touch input is made at the point of time where the said result is greater than a predetermined threshold. To determine such a point of time, various references may be applied. For example, the display apparatus detects a peak 1110 of the reflection wave in the waveform, and determines that a user's touch corresponds to a point of time t4 at which the waveform reaches the threshold within a section where the waveform rises toward the peak 1110. Here, the peak 1110 indicates a point of showing the highest waveform within a section where the waveform is higher than a preset threshold except a section where the waveform corresponds to the reflection wave caused by the second end portion on the bezel.

The reason why not the point of time t5 corresponding to the peak 1110 but the point of time t4 before the peak 1110 is determined as the point of time at which a user's touch is generated is as follows. Specifically, a user's touch operation is generated not at a certain point of time but for a period of time, and thus pressure caused by a user's touch is varied within the period of time. The point of time t5 corresponding to the peak 1110 indicates the point of time at which a user has already touched and held the bezel. Therefore, to more accurately determine the point of time at which a user's touch is generated, the point of time may be detected within the section where the waveform rises before the peak 1110. Of course, this determination method is merely an example, and various methods may be used for the determination.

Figure 12:
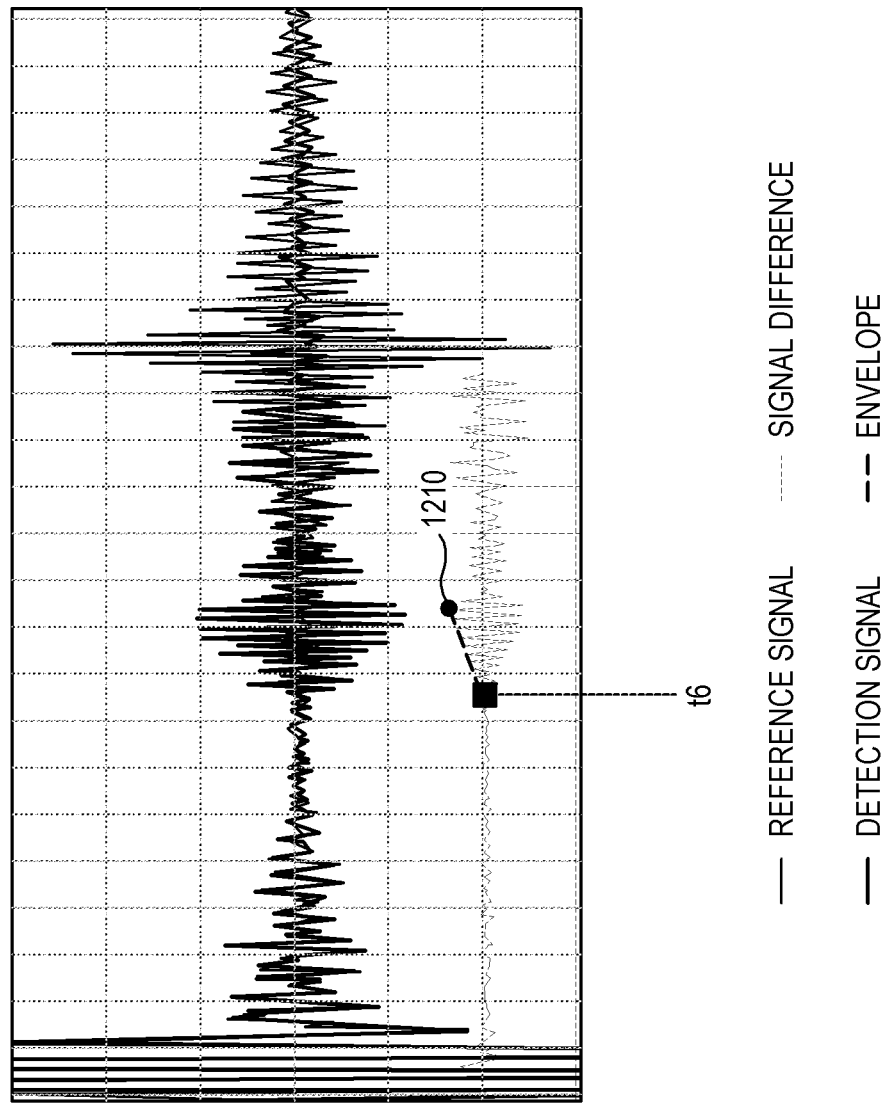
FIG. 12 is a graph of showing a difference between a reference signal and a detection signal in a display apparatus according to one embodiment of the disclosure.

FIG. 12 is a graph of showing a difference between a reference signal and a detection signal in a display apparatus according to one embodiment of the disclosure;

As shown in FIG. 12, the reference signal of the Lamb wave sensed without a user's touch and the detection signal of the Lamb wave sensed with a user's touch may be represented with waveforms in a time domain.

The display apparatus calculates a difference between the reference signal and the detection signal. The difference in strength between the reference signal and the detection signal is calculated according to points of time, and then represented with signal difference waveforms in the time domain as shown in FIG. 12.

The display apparatus detects a peak 1210 caused by the reflection wave within the signal difference waveform. The display apparatus makes a section of a waveform rising toward the peak 1210 undergo an envelope process, and determines that a user's touch is generated at a point of time where the envelope has a level of '0'.

Thus, the display apparatus may determine a user's touch position based on the waveform of the detection signal through various methods.

The envelope is a publicly known mathematical concept. In geometry, an envelope of a family of curves on a plane refers to a curve that touches the edges of each curve. One point at the envelope may be regarded as an intersection between two adjacent curves. In this case, the envelope indicates the limits of intersections between the adjacent curves. When a plurality of pulses propagates oscillating in the time domain, the envelope appears as if it propagates surrounding the edges of these pulses. For example, when the waveform oscillates with a plurality of pulses as shown in FIG. 12 until reaching the peak 1210, the envelope appears as a curve of connecting the edges of the pulses. The concept of the envelope has already known in various descriptions, and thus repetitive descriptions thereof will be avoided in this embodiment.

When a certain point of time is specified, the display apparatus determined a touch position on the bezel based on the specified point of time. When a position where the signal transceiver is installed, i.e. a position where the transmission wave is generated is set to a reference position, the touch position may be expressed by a distance from the reference position. Mathematically, it may be expressed as [(touch position)=(length of bezel)*(point of time at which reflection wave is caused by touch)/(point of time at which reflection wave is caused by second end portion of bezel)].

For example, suppose that the bezel has a length of 80 cm, the signal transceiver is installed in the first end portion of the bezel, and a time of 930 µs is taken in sensing the reflection wave at the second end portion of the bezel. When a time of 500 µs is taken in sensing the reflection wave due to a user's touch with a certain position on the bezel, it is determined that the touch position is distant by about 430 mm from the signal transceiver based on a calculation of [800*500/930].

When a user's touch position on the bezel is determined, the display apparatus performs a preset operation in accordance with the determined positions. Below, an embodiment where the display apparatus operates corresponding to the determined touch position will be described.

Figure 13:
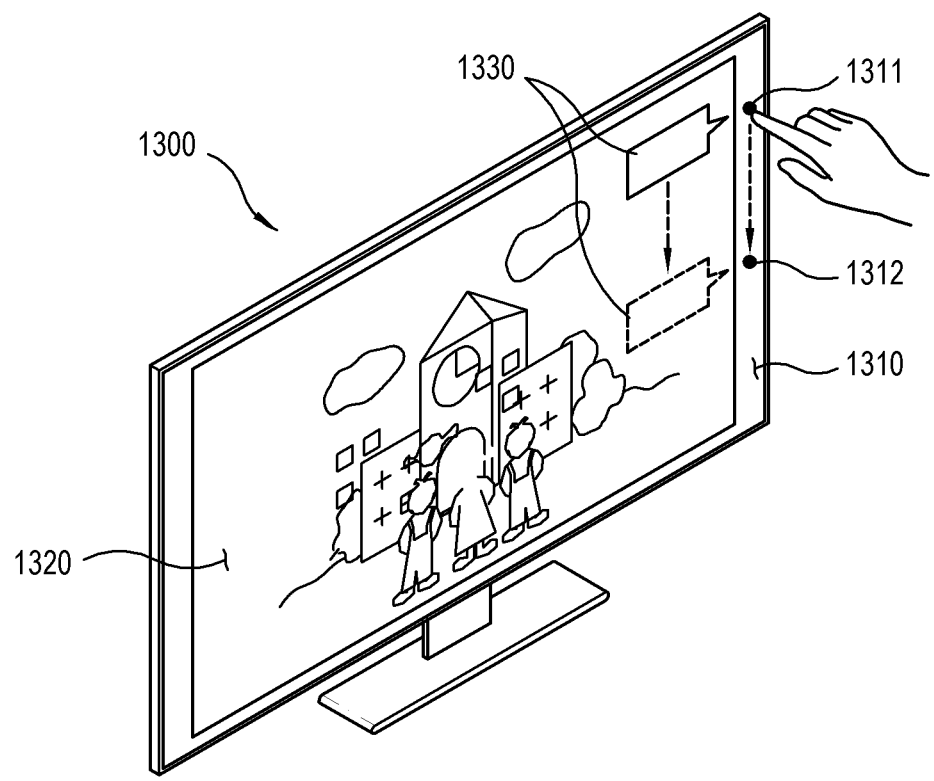
FIG. 13 illustrates an example that a display apparatus according to one embodiment of the disclosure displays a user interface (UI) corresponding to a touch position.

FIG. 13 illustrates an example that a display apparatus according to one embodiment of the disclosure displays a user interface (UI) corresponding to a touch position.

As shown in FIG. 13, a display apparatus 1300 includes a display 1320 configured to display content image, and a bezel 1310 configured to surround four-directional edges of the display 1320. In this embodiment, it will be described only that a user touches a right bezel 1310. However, this embodiment may be equally applied to the other bezels.

When it is determined that a user touches a first position 1311 on the bezel 1310, the display apparatus 1300 displays a UI 1330 on a certain area of the display 1320 near the first position 1311. There are no limits to information involved in the UI 1330. The information may include information about content of a content image being currently displayed on the display 1320. For example, the UI 1330 may include information about a title and a broadcaster of a broadcasting program of a broadcasting program image being currently displayed.

When a user touches the first position 1311 and then drags the touch to the second position 1312 along the bezel 1310, the display apparatus 1300 moves the UI 1330 from an area near the first position 1311 to an area near the second position 1312. When a user's touch is stopped at the second position 1312, the display apparatus 1300 makes the UI 1330 be stationarily displayed in the area near the second position 1312.

While the UI 1330 is continuously moving, the display apparatus 1300 may keep the information in the UI 1330 or make the information in the UI 1330 be continuously varied depending on the movement of the UI 1330. For example, the display apparatus 1300 may display the UI 1330 with information about a current broadcasting program in response to a touch with the first position 1311, and display the UI 1330 with replaced information about a preset recommended program as the touch moves to the second position 1312.

Further, the display apparatus 1300 may display the UI 1330 with a volume control bar when a user initially touches the first position 1311, so that a volume is controlled as a user's touch moves to the second position 1312.

Although the present disclosure has been described with various embodiments, various changes and modifications may be suggested to one skilled in the art. It is intended that the present disclosure encompass such changes and modifications as fall within the scope of the appended claims.

What is claimed is:

1. A display apparatus comprising:
a display;
a bezel extended along at least a part of an edge of the display and configured to cover the at least a part of an edge of the display;
at least one signal transceiver disposed on a first end of the bezel or a portion of the bezel adjacent to the first end thereof to transmit a detection signal to the bezel and receive a reflection signal of the transmitted detection signal; and
a processor configured to identify a touch position of a user on the bezel based on an amount of time taken from a first point of time where the at least one signal transceiver transmits the detection signal to a second point of time where the at least one signal transceiver receives the reflection signal,
wherein an initial reflection signal is a reflection signal of the transmitted detection signal reflected from a second end opposite to the first end of the bezel when there is no user touch on the bezel, and
wherein the identified touch position corresponds to a third point of time where the reflection signal is transmitted toward the at least one signal transceiver due to a user's touch, and is a position between a first position of the bezel, corresponding to the first point of time and a second position of the bezel, corresponding to a fourth point of time where the initial reflection signal is transmitted toward the at least one signal transceiver when there is no user touch.

2. The display apparatus according to claim 1, wherein the third point of time is a point of time where the transmitted detection signal is changed in strength due to a user's touch and converted to the reflection signal.

3. The display apparatus according to claim 2, wherein the processor is configured to obtain a value by dividing an amount of time taken from the first point of time to the third point of time by an amount of time taken from the first point of time to the fourth point of time, and multiply a distance between the first position and the second position by the obtained value so as to identify a distance from the first position to the touch position.

4. The display apparatus according to claim 2, wherein the processor is configured to identify the second point of time caused by the user's touch based on a difference between a first reflection signal detected with the user's touch and a second reflection signal previously stored without the user's touch.

5. The display apparatus according to claim 4, wherein the processor is configured to identify a peak within a section where a signal of showing the difference between the first reflection signal and the second reflection signal is higher than a third threshold, apply an envelope to a section of a waveform rising toward the peak, and identify that the user's touch is performed at a point of time corresponding to a point where the envelope has a level of '0'.

6. The display apparatus according to claim 1, wherein the third point of time is a point of time where the transmitted detection signal has strength higher than a first threshold and is converted to the reflection signal.

7. The display apparatus according to claim 1, wherein the processor is configured to identify the user's touch on the bezel when the reflection signal generated at the touch position is more dampened than a second threshold.

8. The display apparatus according to claim 1, wherein the at least one signal transceiver is configured to oscillate in response to an applied electric signal so as to transmit the detection signal comprising a Lamb wave to the bezel.

9. The display apparatus according to claim 1, wherein the at least one signal transceiver is configured to operate by alternating between a driving mode to transmit the detection signal and a receiving mode to receive the reflection signal of the detection signal transmitted in the driving mode.

10. A method of controlling a display apparatus, the method comprising:
by at least one signal transceiver, transmitting a detection signal to a bezel which is extended along at least a part of an edge of a display and covers the at least part of an edge of the display, the at least one signal transceiver being disposed on a first end of the bezel or a portion of the bezel adjacent to the first end thereof;
by the at least one signal transceiver, receiving a reflection signal of the transmitted detection signal; and
identifying a touch position of a user on the bezel based on an amount of time taken from a first point of time where the at least one signal transceiver transmits the detection signal to a second point of time where the at least one signal transceiver receives the reflection signal,
wherein an initial reflection signal is a reflection signal of the transmitted detection signal reflected from a second end opposite to the first end of the bezel when there is no user touch on the bezel, and
wherein the identified touch position corresponds to a third point of time where the reflection signal is transmitted toward the at least one signal transceiver due to a user's touch, and is a position between a first position of the bezel, corresponding to the first point of time and a second position of the bezel, corresponding to a fourth point of time where the initial reflection signal is transmitted toward the at least one signal transceiver when there is no user touch.

11. The method according to claim 10, wherein the third point of time is a point of time where the transmitted detection signal is changed in strength due to a user's touch, and the identifying of a touch position further comprises converting the transmitted detection signal to the reflection signal in the second point of time.

12. The method according to claim 11, wherein the identifying of the touch position comprises obtaining a value by dividing an amount of time taken from the first point of time to the third point of time by an amount of time taken from the first point of time to the fourth point of time, and multiplying a distance between the first position and the second position by the obtained value so as to identify a distance from the first position to the touch position.

13. The method according to claim 11, wherein the identifying of the touch position comprises identifying the second point of time caused by the user's touch based on a difference between a first reflection signal detected with the user's touch and a second reflection signal previously stored without the user's touch.

14. The method according to claim 13, wherein the identifying of the touch position comprises identifying a peak within a section where a signal of showing the difference between the first reflection signal and the second reflection signal is higher than a third threshold, applying an envelope to a section of a waveform rising toward the peak, and identifying that the user's touch is performed at a point of time corresponding to a point where the envelope has a level of '0'.

15. The method according to claim 10, wherein the third point of time is a point of time where the transmitted detection signal has strength higher than a first threshold, and the identifying of a touch position further comprises converting the transmitted detection signal to the reflection signal in the second point of time.

16. The method according to claim 10, further comprising identifying the user's touch on the bezel when the reflection signal generated at the touch position is more dampened than a second threshold.

17. The method according to claim 10, further comprising oscillating, by the at least one signal transceiver, in response to an applied electric signal so as to transmit the detection signal comprising a Lamb wave to the bezel.

18. The method according to claim 10, further comprising alternating, by the at least one signal transceiver, between a driving mode to transmit the detection signal and a receiving mode to receive the reflection signal of the detection signal transmitted in the driving mode.

* * * * *